United States Patent
Shamir et al.

(10) Patent No.: US 10,871,570 B2
(45) Date of Patent: Dec. 22, 2020

(54) SYSTEM AND METHOD FOR POSITION AND ORIENTATION TRACKING

(71) Applicant: EVERYSIGHT LTD., Haifa (IL)

(72) Inventors: Hanan Shamir, Haifa (IL); Ari Abramson, Haifa (IL); Shmuel Akerman, Haifa (IL); Asaf Ashkenazi, Haifa (IL)

(73) Assignee: EVERYSIGHT LTD., Haifa (IL)

( * ) Notice: Subject to any disclaimer, the term of this patent is extended or adjusted under 35 U.S.C. 154(b) by 0 days.

(21) Appl. No.: 16/647,527

(22) PCT Filed: Sep. 13, 2018

(86) PCT No.: PCT/IL2018/051030
§ 371 (c)(1),
(2) Date: Mar. 16, 2020

(87) PCT Pub. No.: WO2019/053721
PCT Pub. Date: Mar. 21, 2019

(65) Prior Publication Data
US 2020/0278448 A1    Sep. 3, 2020

Related U.S. Application Data

(60) Provisional application No. 62/558,371, filed on Sep. 14, 2017.

(51) Int. Cl.
*G01S 17/66* (2006.01)
*G01S 17/04* (2020.01)
(Continued)

(52) U.S. Cl.
CPC .......... *G01S 17/66* (2013.01); *G01S 7/4802* (2013.01); *G01S 7/4808* (2013.01);
(Continued)

(58) Field of Classification Search
CPC ........ G01S 17/66; G01S 17/04; G01S 7/4802; G01S 7/4808; G01S 7/4913; G01S 17/06; G01S 17/89
(Continued)

(56) References Cited

U.S. PATENT DOCUMENTS

| 4,956,794 A | 9/1990 | Zeevi et al. |
| 5,128,794 A | 7/1992 | Mocker et al. |

(Continued)

OTHER PUBLICATIONS

International Search Report and Written Opinion for PCT Application No. PCT/IL2018/051030, dated Jan. 3, 2019.

*Primary Examiner* — Roy M Punnoose
(74) *Attorney, Agent, or Firm* — Pearl Cohen Zedek Latzer Baratz LLP

(57) ABSTRACT

A system for tracking wearable user devices is provided herein. The system may include a tracking environment, comprising: one or more scene light sources, wherein the location of the scene light sources is known within said tracking environment; one or more scene detectors operable to detect light within the tracking environment, wherein the location and orientation of said one or more scene detectors is known within said tracking environment; one or more scene reflectors operable to reflect light originating from said one or more scene light sources, wherein the location of said one or more scene reflectors is known within said tracking environment; and, one or more wearable user devices comprising a curved reflective surface with known geometry; and, a computer processor operable to analyse light readings detected by said one or more scene detectors, and to calculate a position of the one or more wearable user devices.

20 Claims, 6 Drawing Sheets

(51) Int. Cl.
*G01S 17/06* (2006.01)
*G01S 17/89* (2020.01)
*G01S 7/48* (2006.01)
*G01S 7/4913* (2020.01)

(52) U.S. Cl.
CPC ............ *G01S 7/4913* (2013.01); *G01S 17/04* (2020.01); *G01S 17/06* (2013.01); *G01S 17/89* (2013.01)

(58) Field of Classification Search
USPC ........................................................ 356/614
See application file for complete search history.

(56) References Cited

U.S. PATENT DOCUMENTS

| | | | |
|---|---|---|---|
| 5,424,556 A * | 6/1995 | Symosek | G01S 17/66 250/203.2 |
| 5,812,257 A * | 9/1998 | Teitel | G01S 7/06 342/463 |
| 6,757,068 B2 * | 6/2004 | Foxlin | G02B 27/017 356/139.03 |
| 7,136,170 B2 * | 11/2006 | Notni | G01B 11/2513 356/601 |
| 10,030,931 B1 * | 7/2018 | Black | F41G 3/26 |
| 10,086,282 B2 * | 10/2018 | Mao | A63F 13/428 |
| 10,352,853 B2 * | 7/2019 | Shiono | A61B 5/4064 |
| 2005/0083248 A1 * | 4/2005 | Biocca | H04N 13/194 345/8 |
| 2012/0236321 A1 | 9/2012 | Potin et al. | |
| 2014/0285818 A1 | 9/2014 | Holz | |
| 2018/0210064 A1 * | 7/2018 | Send | G01C 3/08 |
| 2018/0329024 A1 * | 11/2018 | Send | G01S 17/46 |
| 2018/0361232 A1 * | 12/2018 | Mallinson | G01S 17/74 |
| 2018/0364483 A1 * | 12/2018 | Mallinson | G02B 30/50 |

* cited by examiner

SYSTEM AND METHOD FOR POSITION AND ORIENTATION TRACKING

CROSS-REFERENCE TO RELATED APPLICATIONS

This application is a National Phase Application of PCT International Application No. PCT/IL2018/051030, International Filing Date Sep. 13, 2018, entitled: "SYSTEM AND METHOD FOR POSITION AND ORIENTATION TRACKING", published on Mar. 21, 2019, under PCT International Application Publication No. WO 2019/053721, which claims the benefit of U.S. Provisional Patent Application No. 62/558,371, filed on Sep. 14, 2017, which is hereby incorporated by reference in its entirety.

FIELD OF THE INVENTION

The present invention relates generally to systems and methods for position and orientation tracking, and in particular to such systems and methods for tracking the position and orientation of wearable user devices.

BACKGROUND OF THE INVENTION

Prior to setting forth a short discussion of the related art, it may be helpful to set forth definitions of certain terms that will be used herein after.

The term "wearable user device" (WUD) refers herein to any wearable device used or operated directly by an end-user. It may be an accessory worn about the head, such as a pair of glasses, a headset, or a monocle, or alternatively it may be apparel worn about other parts of the body, such as a pair of gloves, a shirt, trousers, shoes, or the like. In the context used herein, WUD refers specifically to an arbitrary platform which may, in some but not all circumstances, be augmented or equipped with image capturing, image processing, illumination and/or wireless communication capability.

The term "tracking environment" refers herein to an enclosed or partially-enclosed three-dimensional space. The dimensions of the environment may be large enough encompass the entirety of a user, or large enough only to encompass a portion of a user. The environment features one or more preinstalled light sources, reflectors and/or cameras, each of which must be located in known or determinable positions. This is to say that the preinstalled elements must have known or determinable positions with respect to a reference coordinate system within the tracking environment. The dimensions of the environment may typically be large enough to facilitate user movement such that the position and orientation of a WUD may be tracked as it is moved by a user within the environment.

The term "reflector" refers herein to components with a reflective or mirror like surface capable of reflecting light rays without significant distortion or modification. Each reflector may be mounted onto a surface within an environment, either directly or indirectly via a fixing, and may be orientated to have a specific field of view. Light incident upon each reflector, such as light originating from a proximate LED, may be reflected into a specific direction, such as in the direction of a proximate camera.

The term "orientation" refers herein to the degree to which an object is tilted or angularly rotated relative to an initial frame of reference or a standard resting state. In the case of WUDs, orientated may be used to describe the direction in which a user wearing, for example glasses, is facing. Orientation may be used to describe the 3D angular direction in which a user is looking, the angular direction possibly being described by yaw, pitch and roll components, or any intermediate combination of the three. It may also be used to describe a user leaning in a certain direction, or a user leaning in a certain direction at the same time as also looking in a certain direction.

Traditional near-field WUD tracking systems (i.e. with up to ten meters range) typically employ either a camera mounted directly onto a WUD, or a camera mounted outside the WUD capturing markers mounted onto or built into the WUD. In the case of the former arrangement, the addition of a camera mounted directly onto the WUD allows for efficient orientation tracking, however the system is significantly more sensitive to light dazzling (e.g. due to direct sun light).

Further, the addition of a camera mounted directly onto the WUD adds to the weight and manufacturing cost of the device, and moreover necessitates a power source within the WUD. In the case of the latter arrangement, mounting markers directly onto the WUD allows for superior location extraction, however the markers are less suited to orientation determination and in some instances may even prevent orientation observation (i.e. when the markers lie along a line perpendicular to the axis of the detector). Further, markers mounted directly onto the WUD generally impede aesthetic character of the device. In modern internet gaming environments where a user is, for example, streaming to many external viewers, the imposition of a garish/unsightly WUD is undesirable. It is therefore an object of the present invention to produce a lightweight, affordable, and aesthetically desirable tracking system capable of efficiently tracking both position and orientation of a WUD.

SUMMARY OF THE PRESENT INVENTION

A system for tracking WUDs is proposed, said system comprising: a tracking environment, comprising: one or more scene light sources, wherein the location of said one or more scene light sources is known within said tracking environment; one or more scene detectors operable to detect light within the tracking environment, wherein the location and orientation of said one or more scene detectors is known within said tracking environment; one or more scene reflectors operable to reflect light originating from said one or more scene light sources, wherein the location of said one or more scene reflectors is known within said tracking environment; and, one or more wearable user devices comprising a curved reflective surface with known geometry; and, a computer processor operable to analyse light readings detected by said one or more scene detectors, and to calculate therefrom a position of said one or more wearable user devices within said tracking environment.

A method for tracking WUDs is also proposed, said method comprising: illuminating a tracking environment with one or more scene light sources, wherein light originating from said one or more scene light sources is reflected by one or more scene reflectors, and wherein the location of said one or more scene light sources and said one or more scene reflectors is known within said tracking environment; detecting, with one or more scene detectors, light reflected from one or more wearable user devices within said tracking environment, wherein the location and orientation of said one or more scene detectors is known within said tracking environment, and wherein said one or more wearable user devices comprises a curved reflective surface with known geometry; and, analyzing light readings detected by said one or more scene detectors and calculating therefrom a position of said one or more wearable user devices within said tracking environment.

These and other advantages of the present invention are set forth in detail in the following description.

BRIEF DESCRIPTION OF THE DRAWINGS

For a better understanding of the invention and in order to show how it may be implemented, references are made, purely by way of example, to the accompanying drawings in which like numerals designate corresponding elements or sections. In the accompanying drawings.

DETAILED DESCRIPTION OF THE INVENTION

Figure 1A:
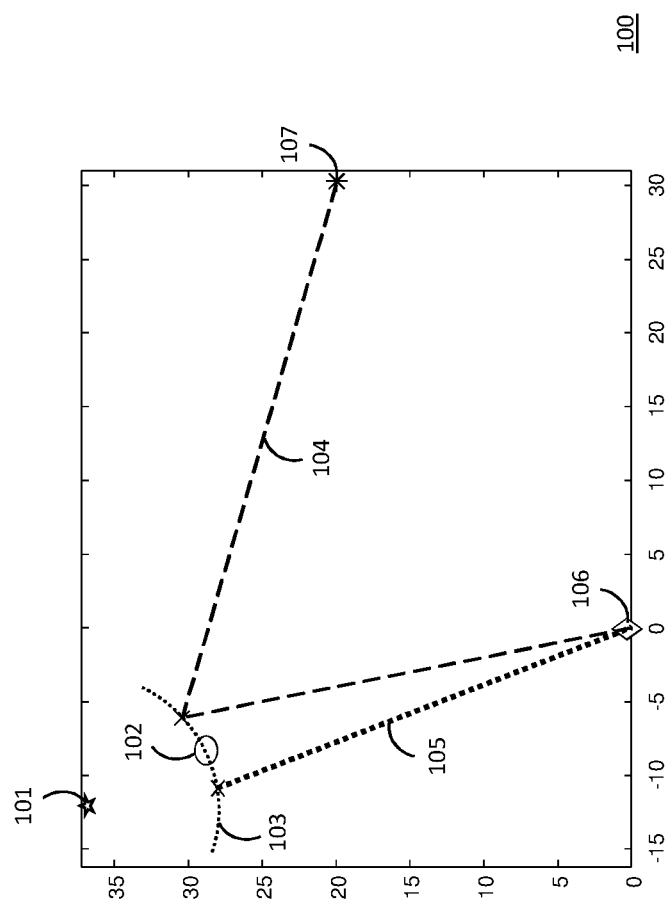
FIG. 1A is a graph diagram illustrating non-limiting exemplary architecture of a system in accordance with embodiments of the present invention.

With specific reference now to the drawings in detail, it is stressed that the particulars shown are for the purpose of example and solely for discussing the preferred embodiments of the present invention and are presented in the cause of providing what is believed to be the most useful and readily understood description of the principles and conceptual aspects of the invention. In this regard, no attempt is made to show structural details of the invention in more detail than is necessary for a fundamental understanding of the invention. The description taken with the drawings makes apparent to those skilled in the art how the several forms of the invention may be embodied in practice.

Before explaining the embodiments of the invention in detail, it is to be understood that the invention is not limited in its application to the details of construction and the arrangement of the components set forth in the following descriptions or illustrated in the drawings. The invention is applicable to other embodiments and may be practiced or carried out in various ways. Also, it is to be understood that the phraseology and terminology employed herein is for the purpose of description and should not be regarded as limiting.

FIG. 1 is a graph diagram illustrating non-limiting exemplary architecture of a system in accordance with embodiments of the invention. The system comprises a tracking environment 100. In some embodiments, the tracking environment 100 may be a room, a cockpit, or the interior of a road vehicle. In alternative embodiments, the tracking environment 100 may be a box, cupboard or portable enclosure. The tracking environment 100 contains one or more scene light sources (not shown) and one or more scene detectors 106 fixed or mounted about its perimeter. The tracking environment 100 may also contain one or more scene reflectors 107 fixed or mounted about its perimeter. The location of the or each scene light source, scene reflector 107, and scene detector 106 within tracking environment 100 is known. This is to say that the x, y and z coordinates of the or each scene light source, scene reflector 107, and scene detector 106 within tracking environment 100 are known with respect to a reference coordinate system.

In preferred embodiments, the or each scene detector 106 will be embodied as a camera, such as an optical or infrared camera. In alternative embodiments, the scene detector 106 may be embodied as any detector appropriate for detecting motion, such as a radar, lidar, or sonar detector. The initial orientation of the or each scene detector 106 is known and defined to, for example, provide the widest coverage over tracking environment 100. In some embodiments, the orientation of the or each scene detector may be varied through use of motorized mounting fixtures. In some embodiments, tracking environment 100 may feature plural scene detectors 106, each scene detector 106 having a known orientation and substantially unique field of coverage. In alternative embodiments, tracking environment 100 may feature plural scene detectors 106, each scene detector having a known orientation and substantially overlapping field of coverage. In embodiments where tracking environment 100 features multiple scene detectors 106, the output from each scene detector 106 may be combined to establish a complete field of coverage, or to verify results and check for inaccuracies.

In preferred embodiments, the or each scene reflector 107 may be embodied as a mirror or substantially reflective surface. In alternative embodiments, the or each scene reflector 107 may be embodied as a retro-reflector operable to reflect light back along a vector path parallel to but opposite the originating light path source. In yet further embodiments, the or each scene reflector 107 may be embodied as an LED, said LED being operable to project light into the tracking environment 100. The or each scene reflector 107 may have a predefined orientation within tracking environment 100, or alternatively may have variable orientation affected by a motor. It will be appreciated that scene reflectors 107 may be employed as a low power and cheap alternative to scene light sources. Accordingly, in embodiments where tracking environment 100 features only one scene light source there must also be at least one scene reflector 107. Scene reflectors 107 act to reflect light emitted from scene light sources into tracking environment 100 from alternative angles of incidence, thereby effectively acting to duplicate the light source.

In preferred embodiments, the or each scene light source is embodied as a standard light emitting diode (LED). In alternative embodiments, the or each scene light source may be embodied as a filament or halogen bulb, or as any other appropriate light emitting device. In preferred embodiments, the or each scene light source may radiate in the visible or infrared spectrum. In alternative embodiments, the or each scene light source may instead be embodied as a source of electromagnetic emission, such as a source of radio waves. Where tracking environment 100 features multiple scene light sources emitting in the visible spectrum, each light source may present with a substantially different color.

The system according to principal embodiments of the invention further comprises one or more wearable user device (WUD) (not shown), the or each WUD being disposed within tracking environment 100. In preferred embodiments, the or each WUD may be embodied as a head mounted display (HMD), such as a headset or pair of smart glasses. The or each WUD comprises a curved reflective surface 103 having known geometric parameters and known center of curvature 101. In preferred embodiments, the or each curved reflective surface 103 may be a reflective visor coupled to a HMD. In preferred embodiments, the or each curved reflective surface 103 may be embodied as a slice of a spherical mirror having a known center of curvature 101. In some embodiments, the or each WUD may further comprise one or more mobile light sources having known position relative to the WUD. The or each mobile light source may be embodied to have substantially the same properties as the or each scene light source.

With the or each WUD disposed within tracking environment 100 and the or each scene light source illuminated, light from the or each scene light source is reflected from the curved reflective surface 103 of the or each WUD onto the or each scene detector 106. FIG. 1 depicts a cost-effective two-dimensional (2D) embodiment where a single scene light source is built into or connected alongside scene detector 106. Light emitted from the scene light source is reflected directly along path 105 within tracking environment 100 by the curved reflective surface 103 of the WUD and is detected by scene detector 106. Light emitted from the scene light source is also reflected indirectly by scene reflector 107 and curved reflective surface 103 along path 104 and is detected by scene detector 106. It will be appreciated that the scene reflector 107 and scene light source are positioned and orientated such that the point of reflection upon curved reflective surface 103 differs between paths 105 and 104. In alternative embodiments, there may be numerous scene light sources, numerous scene reflectors, numerous scene detectors, and numerous WUDs, each disposed about a 3D plane. It will be appreciated that in such embodiments there will be numerous light paths, however the minimum number of light paths required to determine WUD position is two. Further, in alternative embodiments where scene reflector 107 is embodied as a retro-reflector, light travelling along path 104 may strike curved reflective surface 103, reflect towards and strike retro-reflector 107, and then reflect back along the same path 104 to reflective surface 103 and then to scene detector 106.

Light readings obtained by the or each scene detector 106 are communicated via wired or wireless means to a computer processor. The computer processor then analyses the obtained light readings and calculates from said light readings the exact three-dimensional (3D) position of the or each WUD within tracking environment 100. It will be appreciated that this calculation may be performed through geometric analysis given that the 3D position of the or each scene light source, scene detector 106 and scene reflector 107 are known within the tracking environment 100, the orientation of the or each scene detector 106 is known within the tracking environment 100, and given that the obtained light readings result from reflection upon a curved reflective surface 103 of known geometric properties (i.e. known radius of curvature et al).

Figure 1B:
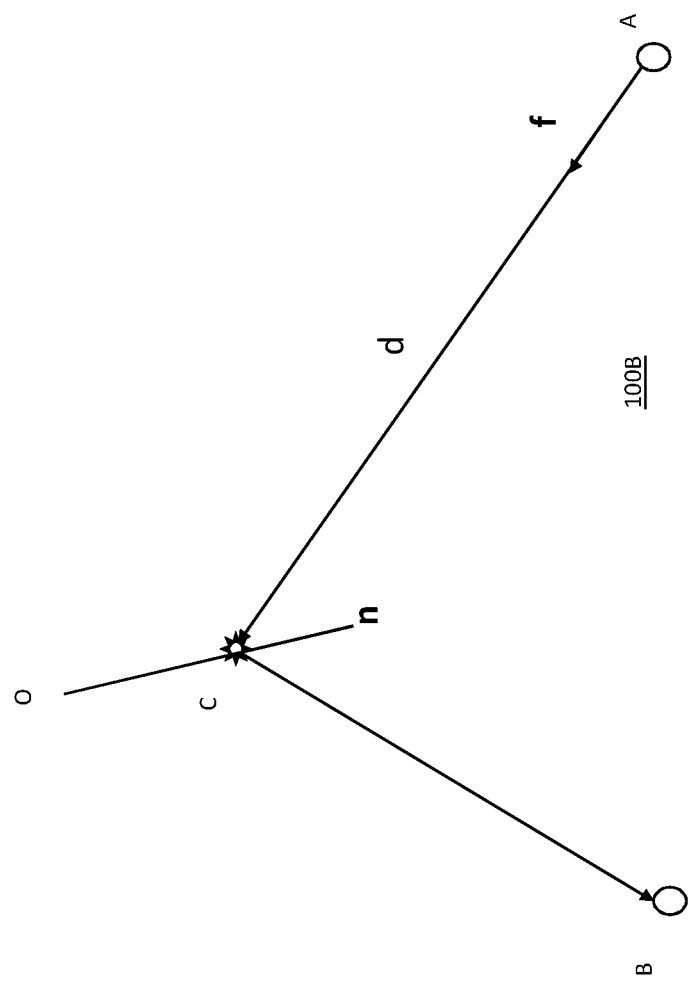
FIG. 1B is a graph diagram illustrating an aspect of the system in accordance with embodiments of the present invention.

FIG. 1B is a graph diagram illustrating an example how the position is calculated by the system in accordance with embodiments of the present invention. In environment 100B, a light source that is reflected from the WUD lens provides the direction to the reflection point C with an unknown distance d. For a given distance d, one can obtain the normal to the lens surface at the reflection point as the angular bisector between AC and BC (the line from the detector to the reflection point and the line from the light source and the reflection point). Assume that the lens is spherical with a known radius r, the sphere center O can be obtained using the following formula:

$$O = A + d*f - r*n \quad (1)$$

Where f is the unit vector representing the reflection direction as seen by the detector, and n is the unit vector of the normal to the lens at the reflection point.

Having two reflections (or more) seen by the detector(s) provide alternate solutions for the sphere center per given distance. Since all centers should coincide at the correct distances (only), minimizing the Euclidian distances between all centers over all distances provide the lens sphere center position with regard to the detector.

Figure 2:
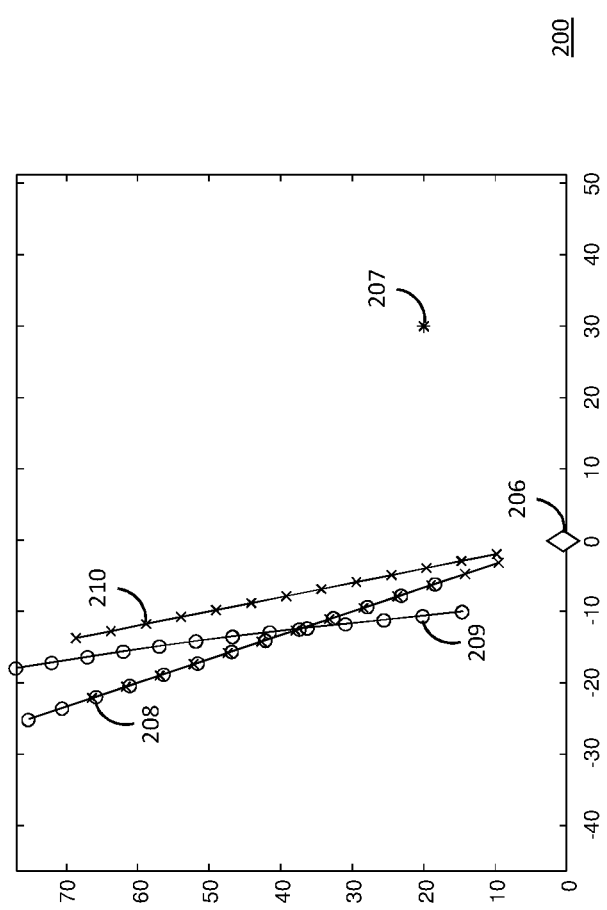
FIG. 2 is a graph diagram illustrating exemplary position tracking in accordance with embodiments of the present invention.

FIG. 2 is a graph diagram illustrating exemplary position determination in accordance with the embodiment depicted in FIG. 1. As the or each WUD, and by extension the or each curved reflective surface, move within tracking environment 200, the reflection point of light originating from the or each scene light source striking upon the or each curved reflective surface is observed by the or each scene detector 206. Each reflection point observed by the or each scene detector 206 corresponds to a specific direction of the curved reflective surface 103, and by extension the WUD, with an unknown distance. Further, each distance corresponds to a specific WUD geometric centrum. The intersection of optional solutions for the geometric centrum based on the or each reflection point is calculated by the processor given the known geometric system parameters to indicate the accurate position of the WUD. For the system arrangement of FIG. 1, optional solutions are depicted in FIG. 2 by paths 208 and 209, the intersection of said paths indicating the geometric centrum of the curved reflective surface 103. It will be appreciated by those skilled in the art that the position of the WUD and the geometric centrum of the curved reflective surface 103 are generally identical, however minor divergence may occur where the shape and size of the WUD is poorly matched with the geometry of the curved reflective surface 103.

Where the WUD further comprises two or more mobile light sources (or retro-reflectors) 102 with known positions on the lens geometry, orientation of the WUD may be determined. Specifically, the position of the or each WUD may be determined through analysis of at least two reflection points as aforementioned. Where these reflection points are further combined with light and reflections from two or more mobile light sources 102, said mobile light sources 102 having known coordinates relative to the WUD, the orientation of the WUD may also be determined. In particular, light originating from mobile light source 102 travels directly to scene detector 106. Combining the direction vector from the detector to each mobile light source (or retro-reflector) 102 together with the WUD lens known position and geometry, one can accurately calculate the position of source 102 by calculating the intersection between the line, obtained by the detector position and the direction of the detected light, with the known WUD geometry (see e.g., https://en.wikipedia.org/wiki/Line%E2%80%93sphere_intersection for the case of a spherical lens). The exact position of 102 can be also translated with respect to the lens geometry. Having at least two such points on the sphere, the orientation of the WUD may be calculated. Specifically, the rotation matrix which rotates the two or more points on the WUD from their known original positions to the measured positions represent the WUD orientation matrix. This can be calculated, e.g., using Kabsch algorithm—https://en.wikipedia.org/wiki/Kabsch_algorithm.

It will be appreciated that light originating from the or each mobile light sources must be incident upon the or each scene detector 106 for this determination to be made. In circumstances where the WUD faces directly away from the or each scene reflector 107, determination of position and orientation may not be possible.

Figure 3:
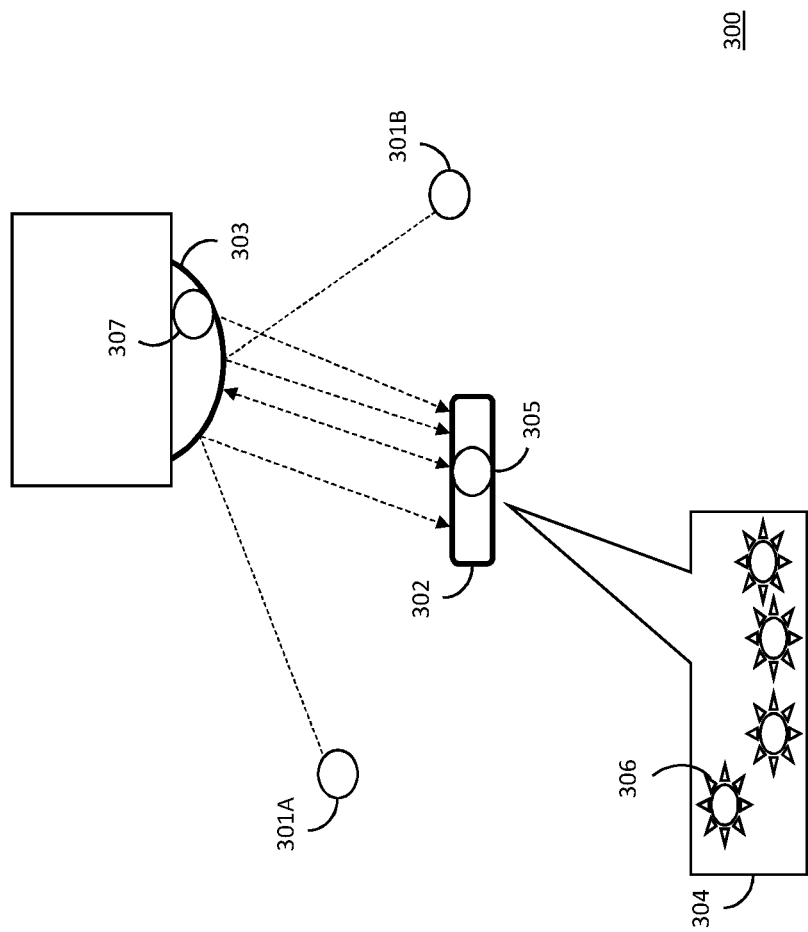
FIG. 3 is a schematic diagram illustrating an exemplary detector arrangement in accordance with embodiments of the present invention.

FIG. 3 is a schematic diagram illustrating an exemplary detector arrangement 300 in accordance with embodiments of the invention. Tracking environment 100 may comprise a plurality of reference tag units (RTU) each embodied as, for example, light emitting diodes (LED) or retro-reflectors 301A, 301B, 305, 307. Each RTU may have known position within tracking environment 100 and may be positioned in relation to a curved reflective surface 303, for example a reflective visor or the like, having known geometry. It is noted that the position of 307 may be known only within the WUT itself. All other are known within the environment. A scene detector 302, which may be a capturing device/camera or the like, is also be disposed within tracking environment 100 with known position and orientation.

One or more scene light sources, which may (or may not) take the form of LEDs 301A, 301B, 305 and/or 307, emit light into tracking environment 100. This light is reflected upon curved reflective surface 303. Or directly, in case of 307, and is captured, for example in the form of image 304, by scene detector 302. By way of example, light emitted/reflected by RTU 301A may follow a path (as depicted) and may be captured in image 304 as light reflection 306. RTU 301A may have a unique indicator, for example due to emitting a particular color of light (e.g., red), and may be associated specifically with light reflection 306. Light emitted/reflected by other RTUs 301B, 305, 307 may likewise have a unique indicator and may also be associated with respective light reflections in image 304. It will be appreciated that due to the geometry of curved reflective surface 303, light reflections captured in image 304 may not necessarily appear in the same 'order' as their respective RTUs are positioned within tracking environment (e.g., when moving from left to right). The relative position of light reflections captured in image 304 may be computed along with: known geometry of curved reflective surface 303; known position of RTUs 301A, 301B, 305, 307 (e.g., with respect to a predefined coordinate system in tracking environment 100); and, known position and orientation of scene detector 302 (e.g., also with respect to a predefined coordinate system in tracking environment 100), to determine (i.e., via calculation, as per the aforementioned) a position and/or orientation (i.e., assuming RTU 307 is present within the arrangement) of curved reflective surface 303 (which may, or may not, be coupled to a WUD) within tracking environment 100.

In some embodiments, RTUs 301A, 301B, 305, 307 may be embodied as infrared (IR) LEDs and may be synchronized with the shutter speed of scene detector 302 (e.g., when embodied as a camera) to increase signal to noise ration (SNR). In alternative embodiments, each RTU 301A, 301B, 305, 307 may be embodied as an LED with independent modulation to assist identifying each respective RTU (i.e., from each other) and to decrease the effects of ambient light interference (i.e., within tracking environment 100).

Figure 4:
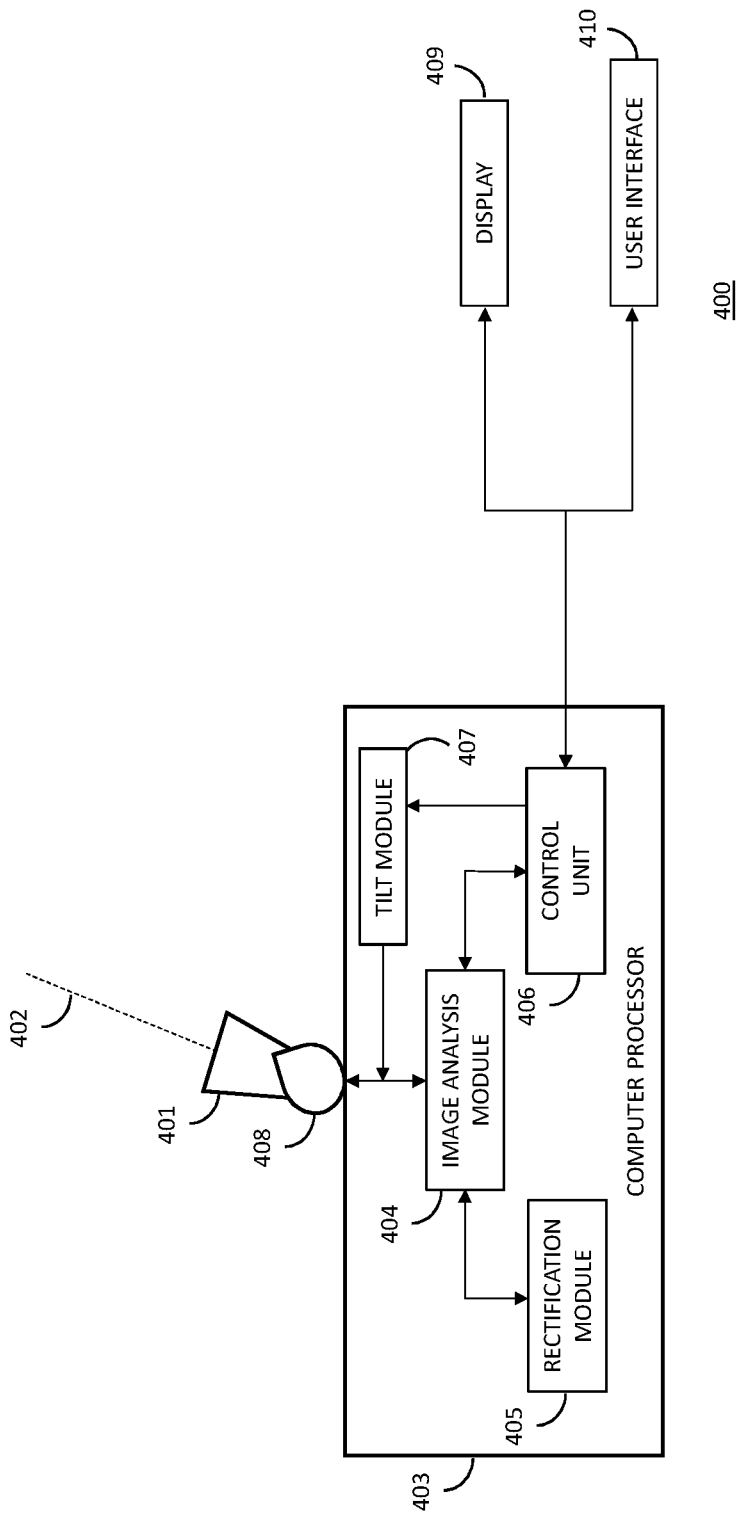
FIG. 4 is a block diagram illustrating exemplary processing architecture in accordance with embodiments of the present invention.

FIG. 4 is a block diagram illustrating exemplary processing architecture in accordance with embodiments of the invention. Light reflections 402 captured by scene detector 401 may be transmitted (e.g., in the form of images, data, or the like), either wirelessly or through wired medium, to a computation unit 403. Computation unit 403 may comprise one or more computer processors (not shown) and one or more sub-units/modules operable to perform specific functions. By way of example, computation unit 403 may receive (i.e., via transmission) copies of captured images 304 and may transfer these to an image analysis module 404. In some instances, captured images 304 may require additional processing and may be reciprocally transferred from image analysis module 404 to, for example, rectification module 405. Image analysis module 404 may run numerous algorithms and calculations (i.e., as per the aforementioned) and may transfer results to a control unit 406. In the event that there is, for example, misalignment or a requirement for further images, control unit may automatically issue instructions to tilt module 407 and thereby command motorized mounting fixture 408 to vary the orientation/capturing angle of scene detector 401. Alternatively, control unit 406 may be operable to output results to an end-user for review via, for example, a display 409 or the like. Where the results indicate, for example, a need for further analysis and/or further captured images, the end-user may utilize an input device, for example user interface 410, to issue commands to control unit 406. These commands may then be implemented by control unit 406, for example by issuing commands to tilt module 407 or image analysis module 404 per the end-u ser's instruction.

Figure 5:
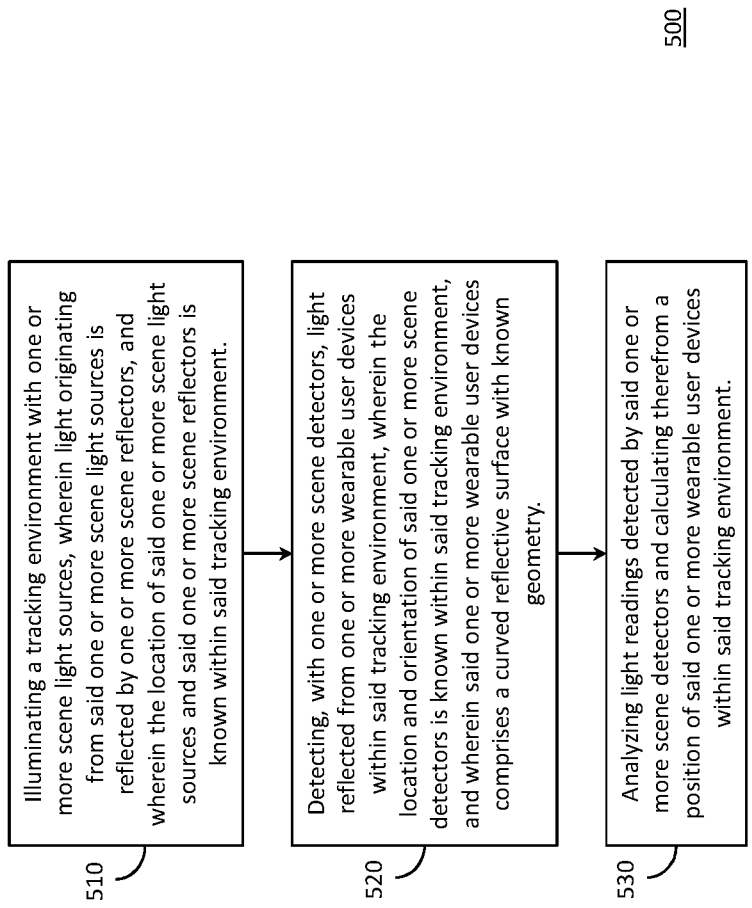
FIG. 5 is a high-level flowchart illustrating a non-limiting exemplary method in accordance with embodiments of the present invention.

FIG. 5 is a high-level flowchart illustrating a non-limiting exemplary method in accordance with embodiments of the invention. The method may comprise: illuminating a tracking environment with one or more scene light sources, wherein light originating from said one or more scene light sources is reflected by one or more scene reflectors, and wherein the location of said one or more scene light sources and said one or more scene reflectors is known within said tracking environment 510; detecting, with one or more scene detectors, light reflected from one or more wearable user devices within said tracking environment, wherein the location and orientation of said one or more scene detectors is known within said tracking environment, and wherein said one or more wearable user devices comprises a curved reflective surface with known geometry 520; and, analyzing light readings detected by said one or more scene detectors and calculating therefrom a position of said one or more wearable user devices within said tracking environment 530.

In some embodiments orientation may be also calculated. Two reflections from RTUs mounted in the environment are sufficient to determine position of the LUT, and together with at least two sources/retro-reflectors mounted on the WUT itself, the orientation can be calculated.

In some embodiments, the exact position of each RTU (e.g., LED or retro-reflector) and the exact position and orientation of each scene detector (e.g., camera) within the tracking environment may be identified using a calibration mirror. The calibration mirror may have known geometry (e.g., it may be flat, or in some cases spherical) and may comprise one or more reflective markers (e.g., stuck/adhered onto the surface). The calibration mirror may be moved through the tracking environment and may be captured (i.e., by one or more scene detectors) together with each of the RTUs. This may be achieved with a single captured image, or with multiple captured images (e.g., one image per RTU). Each of these images is then analyzed (specifically the reflective markers in each image relative to each RTU) to yield a determination of mirror pose relative to the (or each) scene detector for each image. These determinations are then pieced together (i.e., where there is more than one image) to yield a complete determination for the position of each RTU relative to the scene detector (with its respective orientation) within the tracking environment.

In some embodiment calibration may be achieved in environment 100B of FIG. 1B as follows: A known curved mirror centered at 0. Using the detected known markers it is possible to calculate the exact pose (i.e., the exact position and orientation) of the mirror with regard to the detector. Now, analyzing a specific RTU B which is reflected through the mirror to the detector A, it is possible to calculate the line equation from the reflection point C to the RTU B, where the distance to the RTU B is unknown. Specifically, the line direction may be calculated using the (known) mirror surface normal at the reflection point, which serves as the angular bisector from the detector A to the RTU B. Analyzing two or more images with different poses provide different line equations which represent reflections on various mirror poses, but all come from, and must intersect at, the RTU position B. Hence, the intersection between all lines is the optimal position estimate for the RTU B.

In some embodiments, a system according to the invention may comprise a plurality of scene light sources and scene reflectors 107. Such an embodiment may be advantageous in that it is more robust and allows for wider positional and angular coverage of a WUD within the tracking environment 100,200. Such an embodiment may also be less prone to inaccuracy due to noise, interference or similar.

In some embodiments, the or each mobile light source 102 may alternatively or additionally be embodied as a known object mounted on the WUD, said known object being detectable by the or each scene detector 106, 206. Light reflection points detected by the or each scene detector 106, 206 may be coupled with detection of the known object to determine orientation of the WUD.

In some embodiments, the or each mobile light source 102 may alternatively be embodied as a retro-reflector. In systems comprising, for example, a single scene detector coupled with a single scene light source to form combined unit 106, light originating from the combined unit 106 will be reflected directly back to combined unit 106 by retro-reflector 102, thereby fulfilling the same function as mobile light source 102.

In some embodiments, light received from one or more mobile light sources may be analyzed, and one or more wearable user devices may comprise said one or more mobile light sources.

In some embodiments, calculations, based on analyzed light readings arising from said one or more scene light sources and analyzed light readings arising from said one or more mobile light sources, may be performed to yield an orientation of said one or more wearable user devices within said tracking environment.

In some embodiments, at least two scene detectors each having a unique field of coverage may be disposed within the tracking environment, wherein light readings detected by said at least two scene detectors are compared to: check for conformity and inaccuracy; or, to establish redundancy in the event that light readings from one of said at least two scene detectors are missing/omitted.

In some embodiments, at least two scene detectors having a partial or fully overlapping field of coverage are disposed within the tracking environment, wherein light readings detected by said at least two scene detectors are combined to form a complete field of coverage.

In some embodiments, at least one of: said one or more scene detectors and said one or more scene reflectors are coupled to a motorized mounting fixture operable to selectively or automatically vary orientation with respect to said tracking environment.

In some embodiments, at least two scene light sources are disposed within the tracking environment, wherein each of said at least two scene light sources comprises a different colored light emitting diode (LED), filament bulb, or halogen bulb.

In some embodiments, one or more of said scene light sources are operable to radiate in the infrared spectrum; and/or, one or more scene light sources are operable to emit radio spectrum radiation.

The aforementioned diagrams illustrate the architecture, functionality, and operation of possible implementations of systems according to various embodiments of the present invention. In this regard, each portion in the diagrams may represent a module, segment, or portion of code, which comprises one or more executable instructions for implementing the specified logical function(s). It should also be noted that, in some alternative implementations, the functions noted in the portion may occur out of the order noted in the figures. For example, two portions shown in succession may, in fact, be executed substantially concurrently, or the portions may sometimes be executed in the reverse order, depending upon the functionality involved. It will also be noted that each portion of the portion diagrams and/or flowchart illustration, and combinations of portions in the portion diagrams and/or flowchart illustration, can be implemented by special purpose hardware-based systems that perform the specified functions or acts, or combinations of special purpose hardware and computer instructions.

As will be appreciated by one skilled in the art, aspects of the present invention may be embodied as a system or an apparatus. Accordingly, aspects of the present invention may take the form of an entirely hardware embodiment or an embodiment combining software and hardware aspects that may all generally be referred to herein as a "circuit," "module" or "system."

The aforementioned figures illustrate the architecture, functionality, and operation of possible implementations of systems and apparatus according to various embodiments of the present invention. Where referred to in the above description, an embodiment is an example or implementation of the invention. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions. It will further be recognized that the aspects of the invention described hereinabove may be combined or otherwise coexist in embodiments of the invention.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

The descriptions, examples and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with materials equivalent or similar to those described herein.

While the invention has been described with respect to a limited number of embodiments, these should not be construed as limitations on the scope of the invention, but rather as exemplifications of some of the preferred embodiments. Other or equivalent variations, modifications, and applications are also within the scope of the invention. Accordingly, the scope of the invention should not be limited by what has thus far been described, but by the appended claims and their legal equivalents.

The invention claimed is:

1. A system for tracking wearable user devices, the system comprising:
   a tracking environment, comprising:
   i) one or more scene light sources, wherein the location of said one or more scene light sources is known within said tracking environment;
   ii) one or more scene detectors operable to detect light within the tracking environment, wherein the location and orientation of said one or more scene detectors is known within said tracking environment;
   iii) one or more scene reflectors operable to reflect light originating from said one or more scene light sources, wherein the location of said one or more scene reflectors is known within said tracking environment; and,
   iv) one or more wearable user devices comprising a curved reflective surface with known geometry;
   and, a computer processor operable to analyse light readings detected by said one or more scene detectors, and to calculate therefrom a position of said one or more wearable user devices within said tracking environment.

2. The system according to claim 1, wherein said one or more wearable user devices further comprise one or more mobile light sources or retro-reflectors, and wherein said computer processor is further operable to analyse light received from said one or more mobile light sources.

3. The system according to claim 2, wherein said computer processor is further operable to calculate, based on analysed light readings arising from said one or more scene light sources and analysed light readings arising from said one or more mobile light sources, an orientation of said one or more wearable user devices within said tracking environment.

4. The system according to claim 1, wherein said tracking environment is a room, a cockpit, an interior of a road vehicle, a box, a cupboard, or a portable enclosure.

5. The system according to claim 1, wherein one or more of said one or more wearable user devices is a pair of glasses, a headset, a monocle, a pair of gloves, a shirt, a pair of trousers, or a pair of shoes.

6. The system according to claim 1, wherein said tracking environment comprises at least two scene detectors having a unique field of coverage, and wherein light readings detected by said at least two scene detectors are compared by said computer processor to: check for conformity and inaccuracy; or, to establish redundancy in the event that light readings from one of said at least two scene detectors are missing.

7. The system according to claim 1, wherein said tracking environment comprises at least two scene detectors having a partial or fully overlapping field of coverage, and wherein light readings detected by said at least two scene detectors are combined by said computer processor to form a complete field of coverage.

8. The system according to claim 1, wherein at least one of: said one or more scene detectors and said one or more scene reflectors are coupled to a motorized mounting fixture operable to selectively or automatically vary orientation with respect to said tracking environment.

9. The system according to claim 1, wherein said tracking environment comprises at least two scene light sources, and wherein said at least two scene light sources comprise a different coloured light emitting diode (LED), filament bulb, or halogen bulb.

10. The system according to claim 1, wherein said tracking environment comprises: one or more scene light sources operable to radiate in the infrared spectrum; or, one or more scene light sources operable to emit radio spectrum radiation.

11. A method for tracking wearable user devices, the method comprising:
   i) illuminating a tracking environment with one or more scene light sources, wherein light originating from said one or more scene light sources is reflected by one or more scene reflectors, and wherein the location of said one or more scene light sources and said one or more scene reflectors is known within said tracking environment;
   ii) detecting, with one or more scene detectors, light reflected from one or more wearable user devices within said tracking environment, wherein the location and orientation of said one or more scene detectors is known within said tracking environment, and wherein said one or more wearable user devices comprises a curved reflective surface with known geometry; and,
   iii) analysing light readings detected by said one or more scene detectors and calculating therefrom a position of said one or more wearable user devices within said tracking environment.

12. The method according to claim 11, further comprising analysing light received from one or more mobile light sources, wherein said one or more wearable user devices comprise said one or more mobile light sources.

13. The method according to claim 12, further comprising calculating, based on analysed light readings arising from said one or more scene light sources and analysed light readings arising from said one or more mobile light sources, an orientation of said one or more wearable user devices within said tracking environment.

14. The method according to claim 11, wherein said tracking environment is a room, a cockpit, an interior of a road vehicle, a box, a cupboard, or a portable enclosure.

15. The method according to claim 11, wherein one or more of said one or more wearable user devices is a pair of glasses, a headset, a monocle, a pair of gloves, a shirt, a pair of trousers, or a pair of shoes.

16. The method according to claim 11, further comprising at least two scene detectors having a unique field of coverage, wherein light readings detected by said at least two scene detectors are compared to: check for conformity and inaccuracy; or, to establish redundancy in the event that light readings from one of said at least two scene detectors are missing.

17. The method according to claim 11, further comprising at least two scene detectors having a partial or fully overlapping field of coverage, wherein light readings detected by said at least two scene detectors are combined to form a complete field of coverage.

18. The method according to claim 11, wherein at least one of: said one or more scene detectors and said one or more scene reflectors are coupled to a motorized mounting fixture operable to selectively or automatically vary orientation with respect to said tracking environment.

19. The method according to claim 11, further comprising at least two scene light sources, wherein said at least two scene light sources comprise a different coloured light emitting diode (LED), filament bulb, or halogen bulb.

20. The method according to claim 11, further comprising: one or more scene light sources operable to radiate in the infrared spectrum; or, one or more scene light sources operable to emit radio spectrum radiation.

* * * * *